United States Patent [19]
Larson, III et al.

[11] Patent Number: 5,652,074
[45] Date of Patent: Jul. 29, 1997

[54] BATTERY GRIDS, A METHOD FOR MAKING SUCH BATTERY GRIDS AND LEAD-ACID BATTERIES USING SUCH BATTERY GRIDS

[75] Inventors: John G. Larson, III, Alpharetta, Ga.; David Brugger, Bossier City, La.

[73] Assignee: GNB Technologies, Inc., Mendota Heights, Minn.

[21] Appl. No.: 584,057

[22] Filed: Jan. 11, 1996

[51] Int. Cl.$^6$ .................................................. H01M 4/74
[52] U.S. Cl. ........................... 429/242; 29/2; 29/623.5
[58] Field of Search ........................ 427/209; 429/241, 429/242, 160; 29/2, 623.5

[56] References Cited

U.S. PATENT DOCUMENTS

| | | | |
|---|---|---|---|
| 1,069,809 | 8/1913 | Prince | 429/241 |
| 4,469,145 | 9/1984 | Fletcher et al. | 29/2 |
| 5,093,971 | 3/1992 | Hein | 29/2 X |
| 5,401,278 | 3/1995 | Yasuda et al. | 29/2 |

*Primary Examiner*—Stephen Kalafut
*Attorney, Agent, or Firm*—Leydig, Voit & Mayer, Ltd.

[57] ABSTRACT

A method of continuously making plates for a lead-acid battery, and the resulting battery, comprise providing an electrically conductive strip of a lead or lead alloy which is fed into a grid expander which converts the strip into a continuous mesh having a top and bottom bar, feeding the continuous grid mesh into a tab blanker to form the lug for each plate in the top bar and notching the top and bottom bars at spaced locations so that what becomes the corners of the top and bottom frame bars are notched, thereafter pasting the continuous grid mesh with active material paste and then dividing the continuous grid mesh into individual plates, the method disclosed providing a process capable of being reliably run at commercial rates of speed with minimal scrap rates due to separator punctures and the like, the process thus providing sufficiently wide processing latitude which, in the preferred embodiment, can even significantly minimize out-of-specification grids that would otherwise would have to be scrapped.

9 Claims, 4 Drawing Sheets

BATTERY GRIDS, A METHOD FOR MAKING SUCH BATTERY GRIDS AND LEAD-ACID BATTERIES USING SUCH BATTERY GRIDS

FIELD OF THE INVENTION

This invention relates to lead-acid batteries and, more particularly, to grids and plates used in making such batteries and to the method of making such grids and plates.

BACKGROUND OF THE INVENTION

Automotive batteries, typically termed SLI automotive batteries, principally used for starting, lighting and ignition requirements of an automobile, have commonly used lead-acid technology.

Over the last 20 or so years, there has been substantial interest in automotive lead-acid batteries which require, once in service, little, or more desirably, no further maintenance throughout the expected life of the battery. This type of battery is usually termed a "low maintenance" or "maintenance-free" battery. Such low maintenance or maintenance-free batteries were first commercially introduced in about 1972 and are currently in widespread use.

It has been well recognized over the years that lead-acid batteries are perishable products. Eventually, such batteries in service will fail through one or more of several failure modes. Among these failure modes are failure due to positive grid corrosion and excessive water loss. The thrust of maintenance-free batteries has been to provide a battery that would forestall the failure during service for a period considered commensurate with the expected service life of the battery, e.g., three to five years or so.

To achieve this objective, the positive grids used initially for maintenance-free batteries typically had thickness of about 60 to 70 mils or so. The batteries were likewise configured to provide an excess of electrolyte over that needed to provide the rated capacity of the battery. In that fashion, by filling the electrolyte to a level above that of the top of the battery plates, maintenance-free batteries contained, in effect, a reservoir of electrolyte available to replenish the water loss during the service life of the battery. In other words, while the use of appropriate grid alloys will reduce water loss during the service life of the battery, there will always be some loss in service. Having an excess of electrolyte by design will compensate for this loss.

One complicating factor in attempting to provide satisfactory service life is the seemingly ever-increasing power and energy requirements demanded in current SLI automotive batteries used in modern automobiles. Many factors have contributed to the need and/or desire for such higher power and energy for such batteries. One major measure of power currently in common usage is the rated number of cold cranking amps. The number of cold cranking amps is considered in the industry as some indication of the relative power of the battery to start an automobile in cold temperature conditions.

Yet another complicating factor is the "under-the-hood" space requirements. Automobile manufacturers have significantly reduced the overall space available for batteries in the engine compartment. Typically, this has required that battery manufacturers provide a lower profile battery, viz., a battery having less overall height than previously required so as to meet current aerodynamic styling needs in automobiles. Such lower profile batteries will have less acid above the plates.

Another aspect that has occurred in recent years is the substantial increase in the under-the-hood temperature to which the battery is exposed in automobile service. Obviously, the under-the-hood temperature is particularly high in the warmer climates. One automobile manufacturer has perceived that in the past few years, the temperature to which an SLI battery is exposed under-the-hood in such warmer climates has risen about 125° to about 165° to 190° F. in new automobiles.

Specific temperature increase which is involved is not particularly important. What is important is that such under-the-hood temperatures have, in fact, increased. The impact of this increase in the under-the-hood vehicle service temperatures on the failure modes has been to substantially increase the occurrence of premature battery failures. The incidents of premature battery failures due to excessive positive grid corrosion has been significant.

Probably the most widely used technique still for making SLI battery grids has been the conventional book mold gravity casting technique. It has, however, long been recognized that this technique, semi-continuous at best, can cause several production problems. In the first place, gravity casting techniques are subject to various problems which result in scrap as well as lack of product consistency and the like. These problems include operator errors; wide variation in grid wire thickness and hence overall weight due to mold coating variations and irregularities; substantial material handling in production and difficulty in automating such processes and the accompanying inconsistencies due to human error and the like.

Feeding of these individual grid panels by gravity casting techniques into the pasting machine during high speed production conditions can also result in frequent grid jam ups and with resultant scrap. Further, such jam ups result in production stoppage, lost production, clean-up of jams and variation in paste machine set-up and attendant paste weight and paste thickness variations.

Another problem of substantial significance stems from the environmental issues involved in pasting, curing, and assembly of batteries using gravity cast SLI battery grids. Lead dust is a major problem, stemming from loss of powdery active material from cured and dried paste during processing and handling while assembling batteries. Mechanical handling loosens powdery active material since there are no surface barriers. The resulting lead dust must be dealt with in an environmentally satisfactory manner, and production staff have to wear respirators while carrying out pasting and battery assembly operations. Indeed, a great many production safeguards need to be provided to handle powdery lead oxide dust.

Potentially, the use of any continuous process like continuous grid casting or other continuous expanded metal fabrication techniques to make battery grids is capable of minimizing, if not eliminating, one or more of the problems associated with gravity casting techniques. There has accordingly been substantial interest and effort directed to the use of such techniques over the years. This effort has resulted in what is believed to be the widespread use of various continuous, expanded metal fabrication process for making SLI negative battery grids.

The same benefits would result when using continuous processing for making grids and plates for SLI positive battery grids. However, one major issue is present with positive grids and plates that is not an issue with negative battery grids and plates. More particularly, as has been previously alluded to herein, corrosion of the positive battery grid is a principal mode of failure of SLI batteries. At least for this reason, as far as has been perceived, expanded metal fabrication techniques had not been widely used commercially for making SLI positive battery grids, because of increased susceptibility of the continuous cast strip which is expanded into SLI positive grids to positive grid corrosion, prior to the invention set forth in U.S. Pat. No. 5,434,025 to Rao et al.

Various continuous processes for making grids from cast and rolled strip have been proposed. One particularly desirable approach utilizes a directly cast strip, i.e., a continuous strip that is directly cast from molten lead alloy into the thickness desired for making the grids. The casting process thus does not include any cold rolling or other reduction in the thickness of the strip from the cast thickness to the thickness desired for making the grid. Equipment for making a suitable directly cast alloy continuous strip from molten lead alloy is commercially available (Cominco Ltd., Toronto, Canada). In this regard, U.S. Pat. No. 4,315,357 to Laurie et al. illustrates, in general, the method and apparatus for forming the expanded mesh strip necessary for making a continuously cast grid.

U.S. Pat. No. 5,384,217 to Binder et al. refers to problems which can arise in the manufacture of plates from a moving strip or the like. More particularly, it is stated that, in one common battery design, every other plate in the battery stack is inserted into an envelope made of a separator material. The sides of the envelope act as separators between the plates and envelope the two adjoining plates in the battery stack. In assembling a battery of this kind, Binder et al. state that it is necessary to insert the battery plate bottom-first into the open end of the envelope so that the conductive tab at the top of the plate extends out of the envelope. However, the bottom corners on the battery plate are sharp, and will snag and tear the separator material between the positive and negative plates, causing an electrical short within the battery and reducing battery life. It is also stated that bending or vibration of the plate disposed in the envelope during assembly or use can cause tearing, and the problem is not confined to envelope-style separators. Use of battery plates with rounded bottom corners would eliminate the snag and tearing of separators, but, it is stated, no practical process has been proposed for producing rounded corners on such battery plates. In particular, it was noted that any process wherein the rotary divider (i.e., the apparatus described which forms the individual plates by cutting the outline of the individual plates on the moving strip) cuts off corners and results in small pieces of trim (scrap) that are severed from the strip would lead to battery failure if the pieces, if left on the strip after cutting, came loose. The '217 patent describes a process and apparatus for forming a plate by transporting the strip past a divider having a rotary cutter using a plurality of cutting blades, which include lengthwise blades (forming the sides of each plate), central transverse blades (forming the tab on each plate), and rounded blades (for forming the rounded lower corners of each plate). As the blades cut the strip to form the plates and pieces, a vacuum system applies suction to draw the pieces cut from the strip inwardly into the cutter through holes in the cutter, and then out of the cutter.

The approach described in the '217 patent is not considered to provide a satisfactory solution to the diverse problems resulting from making grids in a continuous fashion. In the first place, the '217 patent only discloses carrying out the corner-rounding process at the plate dividing step in the manufacturing of the grid, and, thus, requires extremely complicated processing and apparatus because the moving strip already has been pasted. Secondly, the requirement that the bottom corners be rounded also complicates the apparatus required. Moreover, and contrary to the '217 patent, bottom corner rounding will not eliminate much of the potentiality for separator damage resulting from the configuration of the grid. Still other concerns regarding the '217 approach are that the blades involved are relatively fragile and repair would be costly. Also, such an accommodating structure as envisioned in the '217 patent might possibly weaken the structural integrity of the die.

Thus, there exists a need for a facile process that allows continuous manufacture of lead-acid battery grids so as to obtain the substantial benefits that can be derived from continuous processing, yet which satisfactorily addresses the diverse requirements for such processing.

It is accordingly a principal object of the present invention to provide a commercially viable process for making battery grids using continuous cast grid manufacturing methods.

Another object provides a method, and the resulting grid, which at least minimizes, if not eliminates, potential problems resulting from grid configurations that could weaken, or even tear, the separators used in the battery.

Yet another object lies in the provision of a method for making battery grids which facilitates the assembly of the battery itself made using grids manufactured according to the present invention.

A still further object of the present invention is to provide a process capable of being reliably run at commercial rates of speed with minimal scrap rates due to separator punctures and the like.

Another object of the preferred method of this invention includes a process allowing freedom from defects due to separator impairment, even when the process is operated in less than an optimum fashion. Stated differently, an object of this invention provides a process having wide manufacturing tolerances.

Other objects and advantages of the present invention will become apparent as the following description proceeds.

SUMMARY OF THE INVENTION

The present invention is, in general, predicated on the discovery that separator damage due to the configuration of a continuously cast grid can be substantially minimized, if not eliminated, as a significant processing problem by a facile process which can be readily incorporated into an existing process for making continuous grids, preferably directly cast continuous grids.

More particularly, it has been found that, at the tab blanking step in which the plate lug is formed, this step can be readily modified to achieve the desired corner notching in a fashion that does not adversely affect to any significant extent downstream processing. Indeed, corner notching can be effected in a fashion such that, in the preferred embodiment, a forgiving process is provided with sufficiently wide processing latitude to significantly minimize out-of-specification grids (i.e., scrap).

Still further, it has been found that suitable corner notching must be effected on all corners to minimize potential separator damage. Thus, contrary to the '217 patent, it has been found that suitable corner notching needs to be effected on all the top and bottom corners of the grid to minimize potential separator damage.

DETAILED DESCRIPTION OF THE INVENTION

Figure 1:
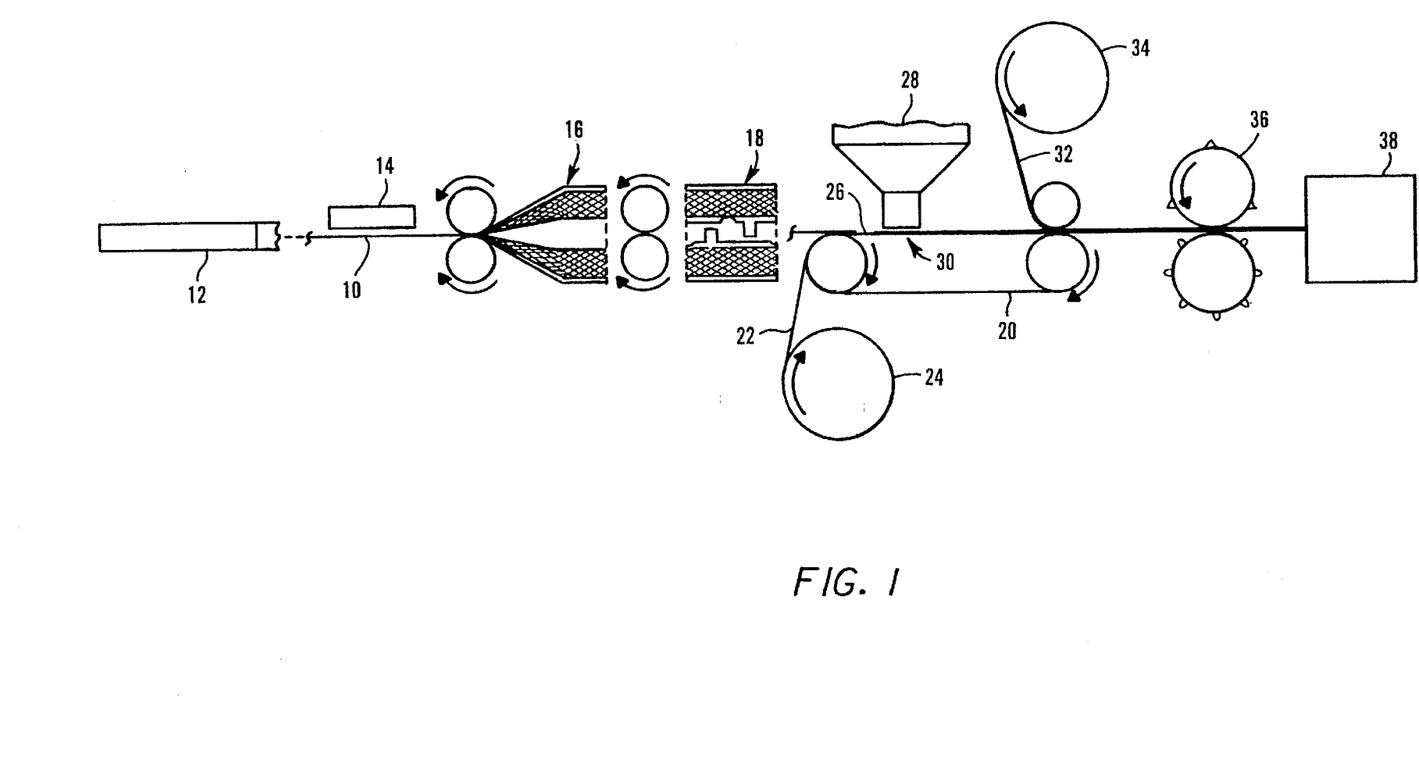
FIG. 1 is a schematic view of a preferred continuous method for making lead-acid positive battery grids and plates in accordance with this invention.

FIG. 1 schematically depicts the various steps and equipment utilized in the preferred embodiment of making the battery plates of the present invention. Other than as will be described in conjunction with the tab blanking step, the equipment utilized comprises a commercially available continuous expanded battery plate production line (Cominco Ltd., Toronto, Canada). In utilizing this line, the strip is in the form of coils, each coil weighing, for example, about 1,500 pounds. Strip 10 from a coil 12 stacked in the horizontal position is continuously fed into the grid expander line. Successive coils can be processed without re-threading by using a strip welder 14 which bonds the end of one coil to the beginning of the next coil. Suitable strip welders can achieve the desired bond with cold pressure, or with a TIG (torch) welding process, as is known. As may be appreciated from the foregoing, when positive plates are being made, the positive grids and plates formed from the strip ends that are bonded together may well have less than optimum high temperature positive grid corrosion resistance. If desired, such grids could be separated out and not used. However, the percentage is so small (e.g., 0.02% of the grids) that separation need not be done.

In the grid expander section, the strip 10 is converted into a grid mesh of the desired size and pattern. In general, the rotary expansion, shown generally at 16, involves an expander tooling module having an assembly of circular cutters mounted on three shafts which cut and preform the strip 10 into an expandable pattern. Center and outside guide protrusions are also cut into the strip which allows engagement by three sets of silent chains in the expansion section. The outside silent chains diverge, causing the mesh to expand away from the center, forming a diamond pattern. As the mesh is expanded, the outside edges elongate more than the center. A stretcher pulls the center portion forward to match the outside edge.

Grid mesh flatteners and coining rollers may be employed to roll the grid expanded mesh to the desired thickness (i.e., flattening out any high spots). Edge trimmers may be used to remove the outside edges of the mesh so as to provide dimensional uniformity and eliminate any ragged or protruding portions.

A tab blanker 18 forms the lug and top frame bar configuration of the plate by punching a slug pattern from the center solid strip. The mesh strip is thus guided through a rotary male/female die assembly which cuts the slugs and ejects them as salvage. A center guide protrusion then is flattened as the grid mesh exits the die set.

The illustrative and preferred embodiment, as previously discussed, forms the top frame bars from the center strip and the bottom frame bars from the two outer strips. This configuration will ultimately result in two sets of plates, staggered in the direction of travel and with the plate lugs facing toward each other as will be discussed hereinafter. However, it is also within the scope of the present invention to form just one set of plates from the strip, if that is desired. Additionally, it should be appreciated that other configurations could be achieved using the same general process and equipment.

In accordance with the present invention, at the tab blanking station, what become the top and bottom frame bars of an individual grid are each notched in a fashion suitable to eliminate problems in subsequent processing, assembly, and even in service, which would otherwise impair the performance of the resulting battery. It has thus been found that, in contrast to other configurations and processing stages at which the corners of the frames could be modified, corner notching in the tab blanking step is much more desirable, not only simplifying the apparatus required but also providing greater flexibility. More specific details of the manner in which the frame bars are notched will be discussed following the general description of the process.

The thus-formed grid mesh strip from the tab blanking step is then continuously moved onto a conveyor belt 20, and active material paste is applied. In the embodiment illustrated, a bottom absorbent paper layer 22 from a roll 24 is positioned between strip 10 and the surface of the conveyor belt 26. Then, positive active material paste from paste hopper 28 is applied to the desired areas of strip 10 in the pasting zone shown generally at 30. Suitable paste-applying apparatus for expanded mesh is known and may be used. As an illustrative example, a suitable paste-applying apparatus is AutoMac 170 Paster (MAC Engineering, Benton Harbor, Mich.).

Suitable positive active material and negative material pastes and densities therefor as well as suitable absorbent materials are described in the Rao et al. '025 patent and may be used in the present invention. The disclosure of the '025 patent in these respects is herein incorporated by reference. Of course, as may be appreciated, any absorbent material that is employed in the preferred embodiment of the process of this invention which is desired may be used, as may any desired positive and negative active material paste and density.

After exiting from the pasting zone, in this illustrative embodiment, an optional step positions a top absorbent layer of paper on the upper pasted surface of the pasted plates so as to shroud the pasted plates, the pasted plates being thus sandwiched between the top and bottom absorbent layers. The purpose of using this optional step is to try to lessen any environmental concerns due to lead dust or the like getting into the air. As shown in FIG. 1, a top absorbent paper layer 32 unwinds from roll 34 and is fed onto the upper surface of the pasted strip 10.

Typically, further processing includes, as in the illustrative preferred embodiment, plate parting (or dividing) and flash drying followed by paste curing, as shown in FIG. 1 at 36 and 38, respectively. These steps can be carried out in any order. However, it is preferred to first carry out the plate parting step because the paper present on either side of the pasted grid mesh prevents the cutters used for plate cutting from removing too much paste; and, also, the active material is soft and less susceptible to cutter damage prior to curing.

Plate parting or dividing employs a rotary cutting die which alternately cuts the pasted grid mesh into left and right plates (viewed from the top). The mesh is suitably guided through this step by using an index ring which engages the center lug cut-outs. The divided individual plates go through a rapidly moving conveyor where pasted plates are heated to remove a small amount of surface moisture. Typically, 15–20% moisture from the plates is removed in this step. The flash-dried plates are stacked in plate trays for further paste curing.

Curing can be carried out by any of the many known techniques. In the preferred practice of this invention, curing of positive pasted plates is carried out by using conditions that favor conversion of tribasic to tetrabasic lead sulfate. Such conditions include temperatures of 175° F. up to 210° F. at relative humidities of 95 to 100%.

Further optional processing steps that could be carried out, if desired, include forced drying of such cured plates at temperatures up to 175° F. and low relative humidity to reduce the free lead content to below 3% and reduce moisture to below 3% level. The negative pasted plates, after flash drying, are usually cured at ambient temperatures for up to 72 hours or can be cured at 110°–148° F. and at 95% humidity for 24–48 hours.

The method of the present invention should be capable of making up to about 800 plates/minute or so while achieving significant improved performance in many respects in comparison to what is achieved using gravity cast grids. The paste weight, density and thickness are thus more readily controlled, as is the paste adhesion during post-curing, so as to minimize checking cracks in the paste. This latter aspect enhances the high rate discharge performance as well as the expected service life.

As is often done with positive plates, the positive plates of the present invention may be enveloped with any desired separator. However, care should be taken in such an enveloping process since grids and plates made by the expanded technique do not include side bars, and the exposed mesh sides or edges thus present a potential problem as regards puncturing the separator if appropriate care is not taken in the enveloping process. The negative plates can also be enveloped, if desired. Any enveloping procedure, of course, should be carefully done.

In contrast, to the conclusions in the '217 patent that it is just the bottom corners that are of a concern and that such corners need to be rounded to eliminate potential separator damage, it has been found that each of the corners of what become the top and bottom frame bars of the grids needs to be notched. More particularly, it has been found that substantial separator damage can result from subtle movement during subsequent processing of one plate relative to an adjacent plate. For whatever reason that such movement results, it has been found that minimizing the resulting separator damage requires notching of each corner of what become the top and bottom frame bars of an individual grid. Still further, it has been found that what is important is that the leading and trailing edges of these frame bars (i.e., that would otherwise present sharp edges or corners) need to be eliminated to minimize damage, not that rounded corners need be utilized to alleviate or minimize such damage.

Accordingly, those and other observations led to the discovery that suitable corner notching could be carried out by modifying the tab blanking step. This then obviates the need for vacuum or other equipment to insure that the corner notch scrap does not stay with continuous strip, as apparently occurs when grid material is removed from the pasted plates as taught by the '217 patent during the plate dividing step.

Figure 2:
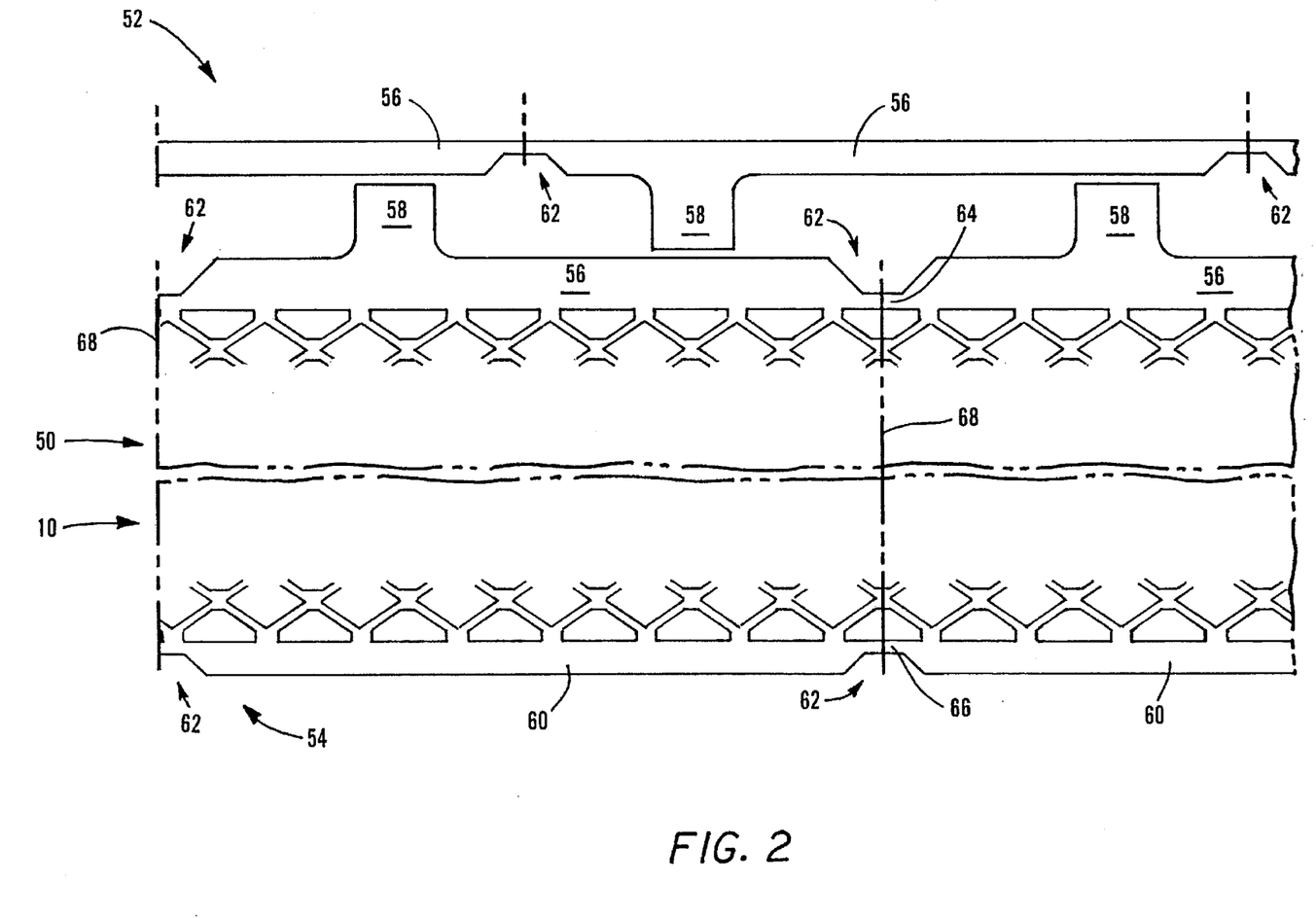
FIG. 2 is a schematic view of the tab blanking step of the method shown in FIG. 1 and illustrating the shallow cut on what become the top frame and bottom frame bars of a battery grid made in accordance with the present invention.

Accordingly, and pursuant to the present invention, what become the corners of the top and bottom frame bars of an individual grid are notched in the tab blanking step. To this end, and as is shown in FIG. 2, the extended mesh strip 10, moving in the direction of travel shown by arrow 50, has a central strip shown generally at 52 which is a solid piece prior to entry into the tab blanking step and outside strips 54 (only one of which is shown in FIG. 2). At the tab blanker 18 (FIG. 1), the central strip 52 is punched out in a slug pattern so as to provide a top frame bar 56 and plate lug 58 for what becomes each plate. In the slug pattern and configuration shown in FIG. 2, the resulting center strip 52 provides top frame bars 56 for two sets of grids with the plate lugs 58 facing each other. The grids are staggered relative to each other in the direction of travel 50 of the moving strip 10. The outside strips 54 each eventually become the bottom frame bar 60 of one of the sets of grids.

Figure 3:
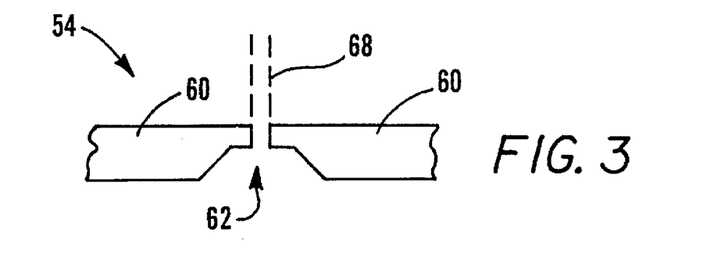
FIG. 3 is a partial schematic view of adjacent frame bars of a grid made in accordance with the present invention and showing the cut between adjacent frame bars with the proper registration during the plate dividing step.
Figure 4:
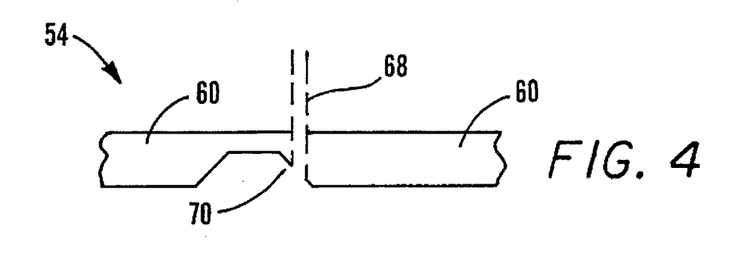
FIG. 4 is a schematic view similar to FIG. 3, except showing the configurations for adjacent frame bars when an out-of-register cut is made.

FIGS. 2–4 show corner notching being carried out pursuant to one embodiment of the present invention. More particularly, as can be seen, a similarly shaped notch 62 in a trapezoidal shape is made leaving connecting areas 64 of the top frame bar 56 and 66 of the bottom frame bar 60 providing an intact, continuous top frame bar and bottom frame bar strip until the plate parting or dividing step in which the individual grids are cut.

The advantages of this embodiment of the present invention, using what may be termed a shallow cut (i.e., a cut not severing the continuous strips that become the top and bottom frame bars) is that the intact, continuous strips allow dimensional stability for the width of the grid, obviating undue expansion of the plate width in the plate pasting step. Also, in this step, a continuous top frame bar provides orientation for the plate dividing step relative to the plate lug which simplifies achieving proper registration. Even further, continuous frame bars enhance dimensional stability during the active material pasting step that minimize plate jam-ups and the like.

When using this embodiment, and while proper registration is facilitated, such proper registration should be maintained during the plate parting step so that the separation into the individual grids is made where desired. More specifically, as is shown in FIGS. 2 and 3, the center strip 52 and the outside strip 54 should be severed at 68 to provide the desired uniform notched configuration.

When the plate parting or dividing step is out-of-register (or out-of-phase), a jagged edge, which may be termed a "fish hook" results. As seen in FIG. 4, when cut 68 is out-of-phase, the frame bar of one grid (bottom frame bar 60 being shown for sake of illustration) results in a fish hook edge as shown at 70.

Maintaining continuous top frame bar and bottom frame strips following the tab blanking step was considered to be not only advantageous but also necessary to provide satisfactory subsequent processing into the individual plates in the continuous process for the reasons previously described herein. And, while this may be desirable for some purposes, a more preferred embodiment of the present invention provides a deep cut (i.e., a cut which severs the strip which becomes the frame bar) of the outside strips that become the bottom frame bars at the tab blanking station. Surprisingly, not only has it been found that the moving strip 10 can be satisfactorily processed into individual plates following a deep cut notching at the tab blanking station, but the deep cut provides significantly increased processing latitude, virtually eliminating any real possibility that the plate parting step will be so far out-of-phase that undesirable fish hooks and the like would result.

Figure 5:
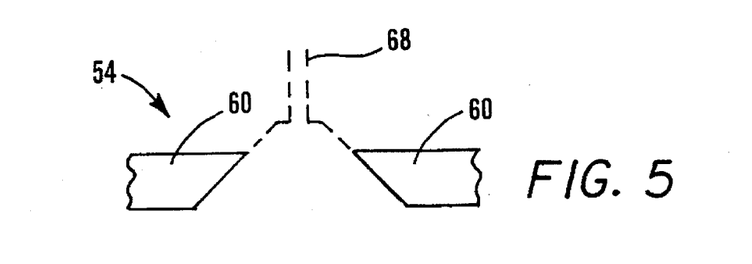
FIG. 5 is a schematic view of a more preferred embodiment of the present invention, showing adjacent frame bars severed with a deep cut in the plate dividing step.
Figure 6:
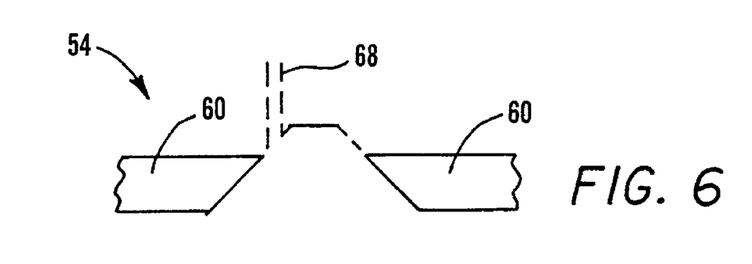
FIG. 6 is a schematic view similar to FIG. 5, except illustrating an out-of-phase or register cut when the more preferred deep cut of the frame bars has been carried out.

FIG. 5 shows, in the plate parting step, the severing of a bottom frame bar 60 when made by an inphase deep cut 68. However, as is shown in FIG. 6, even when cut 68 is out-of-phase (shown in FIG. 6 as being displaced upstream of the in-phase position shown in FIG. 5), the bottom frame bars of adjacent plates are still free of fish hooks or the like.

Moreover, utilizing a deep cut for what becomes the bottom frame bar has been found to accommodate plate height variation. In this fashion, satisfactory notching is achieved even when processing variations in the mesh formation and expansion step results in wider strips, and, thus, increased plate heights. The use of such a deep cut thus virtually obviates the possibility that a corner notch results that is not deep enough to minimize separator damage.

It may even be suitable to use deep cuts on just what becomes the top frame and not the bottom frame bar. This should achieve some dimensional stability, but eliminates the more facile orientation for proper registration for plate dividing obtainable with a continuous top frame. Even further, it may be satisfactory for some applications to use deep cuts on what become both the top and bottom frame bars.

While the illustrative embodiment utilizes a trapezoidal-shaped notching, it should be appreciated that other notch configurations may be employed. The requirements for the notch are that the notch results in removing any sharp corners and allow for process stretch lengthwise and crosswise. Additionally, not only does the notching need not provide rounded corners as required in the '217 patent, but providing such rounded corners unduly complicates the process because the cutter geometry is difficult to machine and to repair. Further, this geometry makes quality control measurements quite difficult.

Another principal advantage of the present invention is that the rotary male/female die assembly conventionally used in the tab blanking step can be easily modified to achieve the uniform corner notching of this invention. More particularly, the die assembly can be modified to include two additional male/female dies, each to form the desired notches at each corner of what will become an individual plate. Alternatively, a second rotary die assembly to form the desired notches could be piggy-backed with the tab-forming rotary die assembly. These and still other alternatives are well within the ordinary skill in the art, given the objectives described herein.

There has been found no need whatever to remove the strip notches by vacuum after being removed in the tab blanking step. The severed trapezoidal notches thus do not adhere to the strips 52 and 54, readily falling by gravity into a scrap heap or the like.

Figure 7:
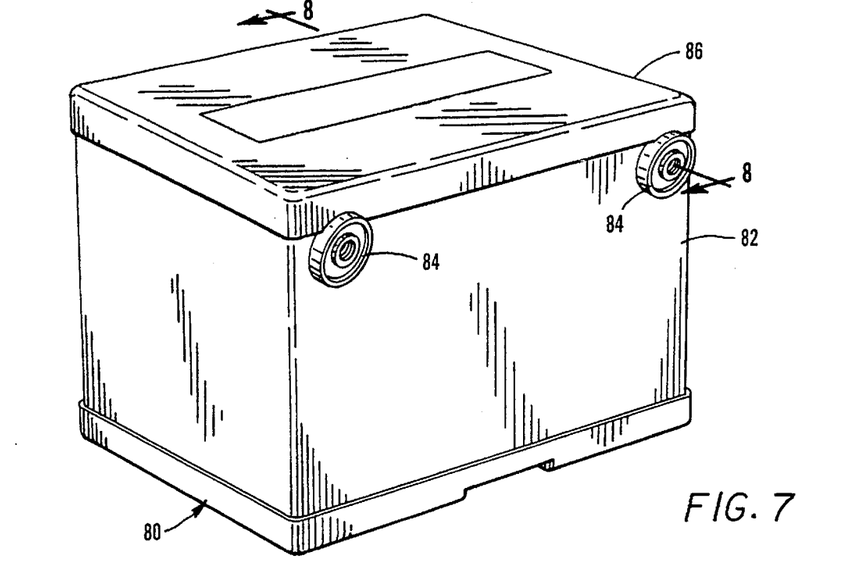
FIG. 7 is an illustrative embodiment of a battery according to the present invention.
Figure 8:
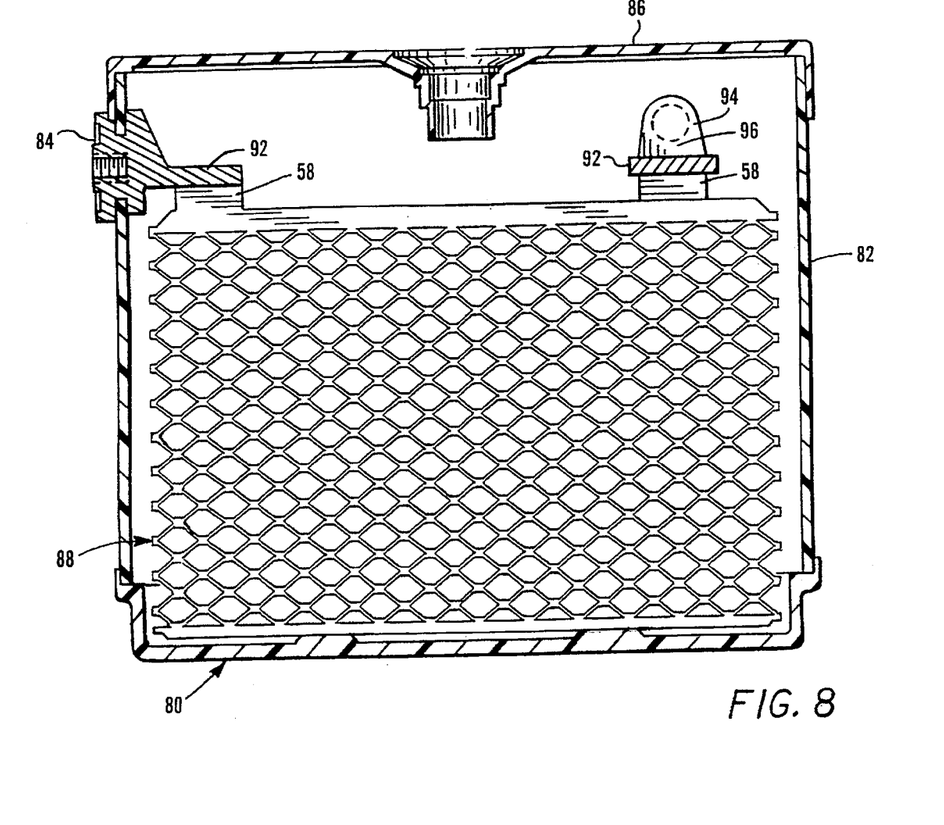
FIG. 8 is a cross-sectional view taken generally 8—8 of FIG. 7 and showing a battery grid made in accordance with the present invention in its assembled position.

FIGS. 7 and 8 show a maintenance-free battery utilizing the grids of the present invention. Thus, a maintenance-free battery 80 is shown which includes a container 82, a pair of side terminal posts 84, and a cover 86 sealed to the container by any conventional means. The container is divided into a plurality of cells, a portion of one cell being shown in FIG. 8; and a battery element is disposed in each of these cells.

The battery element comprises a plurality of electrodes and separators, one of the positive grids being shown generally at 88. The negative grids are of identical or similar construction but are formed with any desired antimony-free alloy. The electrode illustrated includes a supporting grid structure 90 having an integral lug 58 and a layer of active material pasted thereto; and a strap 92 joining the lugs 58 of the respective positive and negative grids together.

Intercell connectors are shown generally at 94 and include a "tombstone" 96 which forms a part of the strap 92. The strap 92 may be fused to the grid lugs 58 in assembling the components into an element as is known. The terminals 84 are similarly electrically connected through separate straps 92 to the supporting grid structure 90 during assembly, the base of the terminal forming a part of the strap 92. Suitable manifold venting systems for allowing evolved gasses to escape are shown at 98. Many satisfactory venting systems are known. In addition, the particular design configurations of the battery may be varied as desired for the intended application.

Thus, as has been seen, the present invention provides a facile process for making lead-acid battery grids on a continuous basis at commercially acceptable rates of production. The problems in assembly and service that have prevented complete utilization of continuous grid-making processes have been obviated.

We claim:

1. A method of continuously making plates for a lead-acid battery, each of such plates having a top frame bar with a plate lug, a bottom frame bar and grid mesh connecting the top and bottom frame bars, each of the corners of the frame bars being notched, which method comprises:

providing an electrically conductive strip, feeding said strip into a grid expander to convert said strip into a continuous grid mesh having a top and bottom bar, - feeding said continuous grid mesh with the top and bottom bar into a tab blanker to form the lug for each plate in the top bar and notching the top and bottom bars at spaced locations such that what becomes the corners of the top and bottom frame bars are notched, pasting the continuous grid mesh with active material paste, and dividing the continuous grid mesh into individual plates.

2. The method of claim 1, wherein said strip is a directly cast strip.

3. The method of claim 1, wherein said strip comprises a lead alloy.

4. The method of claim 1, wherein the notches on the bottom bar are deep cuts.

5. The method of claim 1, wherein the notches on the top bar are deep cuts.

6. The method of claim 1, wherein said notches are deep cuts.

7. The method of claim 1, wherein said notches are of a trapezoidal shape.

8. A method of continuously making plates for a lead-acid battery, each of such plates having a top frame bar with a plate lug, a bottom frame bar and grid mesh connecting the top and bottom frame bars, each of the corners of the frame bars being notched, which method comprises:

providing an electrically conductive strip and moving the strip in a direction of travel, feeding said strip into a grid expander to convert said strip into a continuous grid mesh having a central bar positioned to divide the grid mesh and an outside bar on each edge of the strip, feeding said continuous grid mesh into a tab blanker to form the lug for each plate in the central bar and notching the central and outside bars at spaced locations such that what becomes the corners of the top and bottom frame bars are notched, the central bar forming plate lugs for two sets of grids with the plate lugs facing each other and grids being staggered relative to each other in the direction of travel of the strip, pasting the continuous grid mesh with active material paste, and dividing the continuous grid mesh into individual plates.

9. A lead-acid battery which comprises a container divided into a plurality of cells, a battery element disposed in each of said cells, each battery element comprising a plurality of electrodes and separators, and each cell being electrically connected together, at least some of said electrodes comprising an electrically conductive plate comprising a top frame bar having a plate lug, a bottom frame bar and grid mesh connecting said top and bottom frame bars, each of the corners of the top and bottom frame bars being notched.

* * * * *